May 10, 1932. B. V. E. NORDBERG 1,857,256
DIESEL ENGINE
Original Filed Feb. 25, 1929
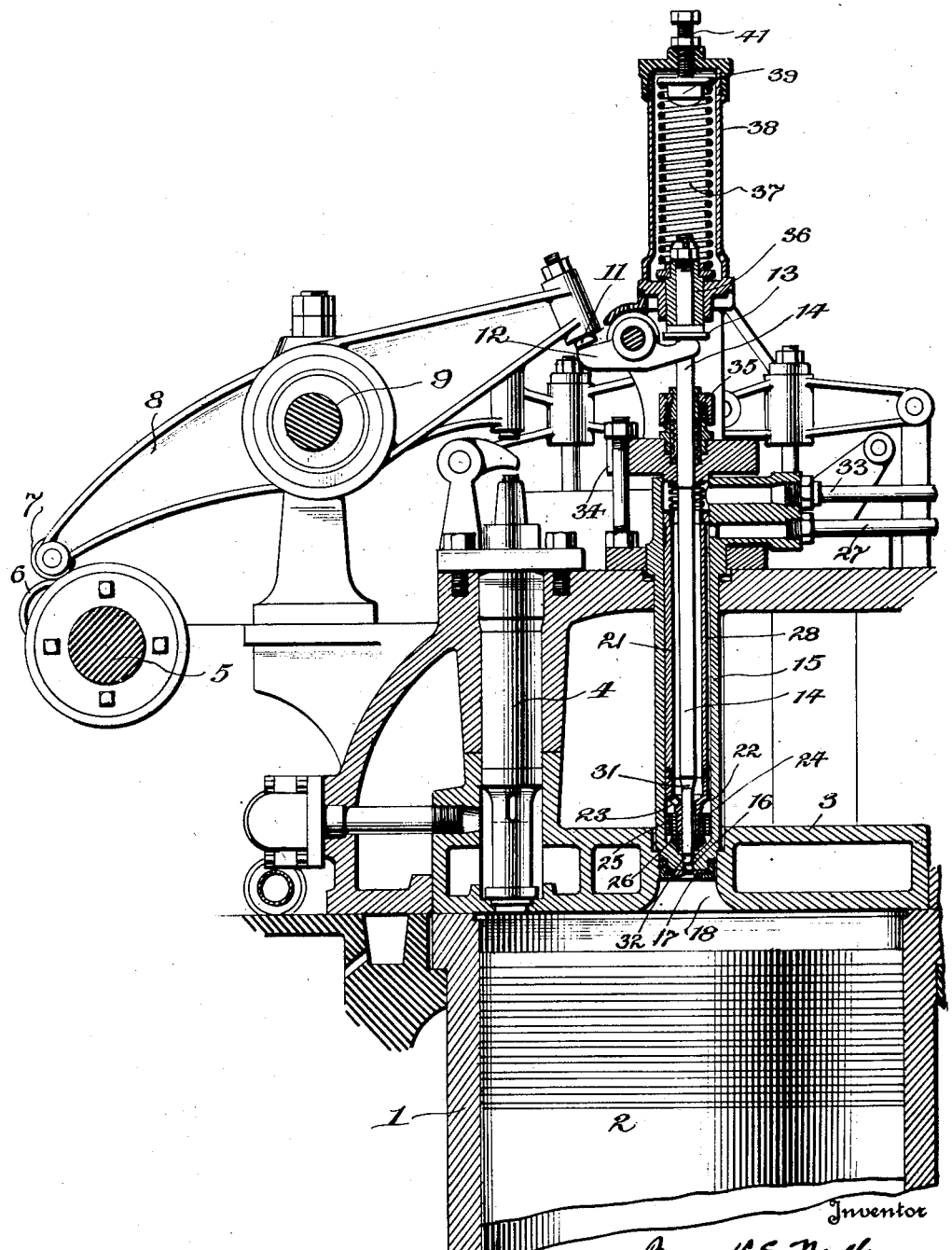

Patented May 10, 1932

1,857,256

UNITED STATES PATENT OFFICE

BRUNO V. E. NORDBERG, OF MILWAUKEE, WISCONSIN, ASSIGNOR TO NORDBERG MANUFACTURING COMPANY, OF MILWAUKEE, WISCONSIN, A CORPORATION OF WISCONSIN

DIESEL ENGINE

Application filed February 25, 1929, Serial No. 342,442. Renewed February 26, 1931.

This invention relates to Diesel engines and particularly to a method of operating Diesel engines (preferably engines of the air injection type) using a gaseous fuel as a partial source of power.

It is difficult to use gaseous fuel in a Diesel cycle, because ignition is sluggish, and a leaky piston or cold cylinder walls, or both, will seriously affect operation. There is, however, an active demand for a Diesel engine which will run on natural (or other) gas and which can be changed over without undue expense to run on fuel oil, in the event that the gas supply fails or becomes unduly expensive.

The invention involves the use of a booster charge of oil, which ensures ignition of the gas. The quantity of oil fed is preferably somewhat less than sufficient to keep the engine in motion under no load conditions and the gas carries the remainder. The oil and gas are injected together in such a way that a spray of oil is formed in a blast of gas, at the moment of high compression in the working space. The oil ignites and the two burn together. The simplest way of practicing the invention is by modifying a conventional air injection Diesel engine so that the quantity of fuel oil fed is reduced and the fuel oil is sprayed by combustible gas under pressure instead of air. The change of the oil fuel feed rate is a matter of adjustment. The blast compressor inlet is merely connected to a gas main. The blast compression is customarily a multiple stage compressor with intercoolers and no material change is necessary to convert from air to gas. When natural gas is used the compressor customarily used for air injection is about large enough to handle the necessary quantity of gas. When illuminating gas, which has a much lower B. t. u. content, is used, the quantity of gas to be compressed is larger than the quantity of air needed for air injection of oil for the same power output. An engine to operate convertibly on illuminating gas and oil should therefore include a blast compressor whose capacity is variable. This variation in capacity may be secured by known means for varying compressor capacity, such as the provision of a low pressure booster stage which is used only when the larger capacity is desired for gas operation, or by using a larger stage compressor than usual in conventional Diesel engines and throttling its intake to reduce its capacity when using air. Such mechanical details are not involved in the present application.

The engine may operate on either the two or four stroke cycle, and in two cycle engines scavenging details follow standard practice.

Control of the engine may be had by control of either oil or gas, or both, as the designer may prefer or occasion require. An important precaution is that blast pressure shall never fall below cylinder compression pressure, otherwise air may penetrate to the gas line and cause an explosion. The details of control, however, are not involved in the present application.

For purposes of explanation, and without implying limitation to the engine illustrated, the invention will be described as practiced with a known type of air injection Diesel engine illustrated in part in the accompanying drawing.

The drawing shows, principally in vertical axial section, the upper end of a single acting Diesel engine cylinder of the type specified.

In the drawing, the cylinder walls are shown at 1, the piston at 2, the cylinder head at 3, and an air starting valve at 4. All these parts follow standard practice, their design and operation being unchanged.

So far as the invention is concerned, it is immaterial whether the engine is two or four cycle. In either case a cam shaft 5 would be used. In the case of a two cycle engine it would turn at crank speed, and in the case of a four cycle engine it would turn at half crank speed. In a two cycle engine the exhaust and scavenging ports are customarily formed in the cylinder walls 1 and are overtraveled by the piston 2, while in a four cycle engine special valve arrangements are used.

No exhaust mechanism is illustrated in the drawing, and the only important point is that any known exhaust mechanism may be used.

The cam shaft 5 carries a cam 6 which engages a roller 7 on the rocker arm 8. This rocker arm is journaled on the fixed shaft 9 and carries an adjustable tappet 11 which coacts with the rocker 12. The rocker 12 coacts with a collar 13 on the stem 14 of the fuel injecting needle valve. The body of this valve consists of a casing 15 which is inserted through an opening in the head 3, and which has at its lower end a ported valve seat 16 which leads by way of removable nozzle plate 17 to a flaring discharge opening 18 in the lower side of the cylinder head 3.

Mounted coaxially within the body 15 is a sleeve 21 which has a reducing shoulder 22 in which is formed a port 23. Below the reducing shoulder 22 is a slender tubular guide portion 24 around which are assembled a plurality of perforated disks 25. These are retained by a nut 26.

These perforated disks receive fuel oil which arrives by way of pipe 27, from any suitable fuel oil pump, not shown, and then flows down a narrow passage 28 between the sleeve 21 and the body 15. The purpose of the perforated disks 25 is to hold the fuel oil in a dispersed condition so it may be picked up and sprayed by the blast.

The stem 14 extends downward within the sleeve 21, leaving ample clearance within the sleeve for the passage of the blast, is reduced or shouldered at 31, and terminates in a needle injecting valve 32 which coacts with seat 16 in the end of the body 15, slightly above the nozzle plate 17.

In prior practice the blast was air, and the present invention contemplates the substitution of a combustible gas, such as illuminating gas or natural gas, either of which is more difficult to ignite than the fuel oil. This gas arrives under an appropriate pressure, higher than the compression pressure in the cylinder, by way of a pipe 33 also connected to the body 15, and thence flows downward within the shell 21 and through the port 23 so as to impinge upon the oil sustained by the perforated disks 25. The gas pressure is constantly acting within the injection nozzle, but the blast occurs only when the needle valve 32 lifts from its seat, and this occurs when the cam 6 strikes the roller 7, at or near the head end dead point of the piston 2.

It will be observed that the stem 14 of the needle valve is guided at its lower end in the reduced portion 24 of the sleeve 21. It is also guided by the head 34, which is removably mounted on the upper end of the body 15 of the fuel injecting valve. Leakage is prevented by a stuffing box 35.

The upper end of the stem 14 is further guided by a slider 36, fixed on the upper end of the sleeve 21, and mounted to reciprocate vertically in a guideway formed therefor. The slider 36 also serves to receive the downward thrust of a spring 37 housed in a casing 38. The stress on the spring is adjusted by adjusting the upper spring seat 39 by means of an adjusting screw 41.

Diesel engines of the air injection type customarily include a multi-stage compressor, commonly three stage, which takes atmospheric air and compresses it to a pressure of the order of one thousand pounds to the square inch. These compressors are provided with intercoolers. Intercoolers are not necessary where combustible gas is being compressed, but their presence is not objectionable.

The essential operations, therefore, to convert to gas operation, are to connect the gas main to the intake of the blast compressor, and reduce the amount of oil fed through the pipe 27 for each engine cycle, in a corresponding amount. Obviously, both the oil and the gas are burned, the oil igniting first and acting as a combustible charge to ignite the gas.

The division of work between the two fuels is subject to variation in accordance with particular conditions, but I have successfully used, and prefer, the arrangement in which the fuel oil is somewhat less than sufficient to operate the engine at no load. Gas is used only when it is cheaper as a fuel than oil, so that the obvious course is to reduce the oil to the practicable minimum.

The present application is not concerned with details of speed regulation or power control, but the economical arrangement is to vary the quantity of the gas, or both gas and oil. Since conventional air injection Diesel engines can be converted to the new cycle of operation without material change in their fuel feeding structure, it is apparent that an engine installed to operate on gas with a combustible charge of oil, can be readily changed to operate on oil alone, with an air blast at small expense. The only mechanical limitation is a sufficiently flexible fuel feed to permit the necessary change in the quantity of oil-fuel, or provision for the substitution of interchangeable oil-fuel feeding elements.

It is contemplated that engines intended for convertible use using oil only, or oil and gas of relatively low B. t. u. content, will have blast compressors of variable capacity capable of handling the excess quantity of compressed gas over the air necessary when operating on oil alone. So far as the method of operating on gas and oil is concerned, this feature is not directly involved and is not here claimed, the apparatus features being reserved for other applications. It is contemplated that an engine designed with a variable capacity blast compressor of the necessary maximum capacity may be adjusted to operate with oil alone, or with oil and gases of various characteristics as to B. t. u. content.

What is claimed is,—

1. The method of operating a Diesel engine of the air injection type, which consists in reducing in quantity the oil fuel charge and substituting for the fuel injecting air a combustible gas under similar pressure.

2. The method of operating a Diesel engine of the air injection type, which consists in supplying oil in quantity less than sufficient to operate the engine at no load, and substituting for the injecting air a combustible gas under a similar pressure.

3. The method of operating a Diesel engine of the air injection type having a fuel spraying nozzle and a valve controlling its communication with the working space, which consists in supplying to said nozzle a fuel oil and a combustible gas in lieu of air at a pressure higher than the compression pressure in the working space, whereby the oil is sprayed into the working space by the gas.

4. The method of operating a Diesel engine, which consists in injecting into air highly compressed in the working space, a spray of combustible oil enveloped in an atmosphere of combustible gas.

5. The method of operating a Diesel engine, which consists in injecting into air highly compressed in the working space, a spray of combustible oil inflammable at the temperature of compression enveloped in an atmosphere of a relatively less inflammable combustible gas.

6. The method of operating a Diesel engine, which consists in atomizing in highly compressed air in the working space, an inflammable fuel oil by means of a blast of combustible gas.

7. The method of operating a Diesel engine, which consists in atomizing in highly compressed air in the working space, an inflammable fuel oil by means of a blast of less inflammable combustible gas.

8. The method of operating a Diesel engine, which consists in simultaneously injecting into the working space at a time of high compression, a spray of combustible oil and a blast of combustible gas, in such relation that the two mix and burn together.

9. The method of operating a Diesel engine, which consists substantially simultaneously introducing into the working space filled with highly compressed air, a spray of inflammable fuel oil and a blast of combustible gas in such relation that the oil ignites while enveloped in a mixture of gas and air.

10. The method of operating a Diesel engine, which consists in injecting into the working space while filled with highly compressed air, a spray of oil followed by and at least partially mingled with a blast of combustible gas.

11. The method of operating a Diesel engine, which consists in deriving the major portion of the energy by combustion of an inflammable gas in the working space, and initiating said combustion and supplementing energy developed by the gas by spontaneous ignition and combustion of a relatively more inflammable oil.

12. The method of operating a Diesel engine, which consists in deriving the major portion of the energy by combustion of an inflammable gas in the working space, and initiating said combustion and supplementing energy developed by the gas by spontaneous ignition and combustion of a relatively more inflammable oil, the total energy developed by combustion of the oil being insufficient to operate the engine at no load.

13. The method of operating a Diesel engine which consists in simultaneously burning in compressed air in the combustion space a charge comprising a highly combustible oil and a relatively less combustible gas.

14. The method of operating a Diesel engine which consists in simultaneously burning in compressed air in the combustion space a charge comprising a highly combustible oil and a relatively less combustible gas, such combustion being initiated by spontaneous ignition of the oil.

15. The method of operating a Diesel engine which consists in simultaneously burning in compressed air in the combustion space a charge comprising a highly combustible oil and a relatively less combustible gas, such combustion being initiated by spontaneous ignition of the oil while in a dispersed condition in the working space.

16. The method of operating a Diesel engine, which consists in simultaneously injecting into the working space at a time of high compression, a spray of combustible oil and a blast of combustible gas in such relation that the two mix and burn together, the oil being relatively more inflammable than the gas and serving to initiate combustion by spontaneous ignition.

17. The method of operating a Diesel engine, which consists in simultaneously injecting into the working space at a time of high compression, a spray of combustible oil and a blast of combustible gas in such relation that the two mix and burn together, the oil being relatively more combustible than the gas and being injected at least as early as the earliest entrance of the gas and serving to initiate combustion by spontaneous ignition.

In testimony whereof I have signed my name to this specification.

BRUNO V. E. NORDBERG.